United States Patent [19]

Holl et al.

[11] Patent Number: 4,894,168

[45] Date of Patent: Jan. 16, 1990

[54] PROCESS FOR THE REMOVAL OF CATIONS OF AN ALKALINE EARTH METAL SPECIES FROM AQUEOUS SOLUTIONS WITH AN ION EXCHANGER MATERIAL

[75] Inventors: Wolfgang Holl, Ettlingen; Siegfried Eberle, Eggenstein; Jurgen Horst, Karlsruhe, all of Fed. Rep. of Germany

[73] Assignee: Kernforschungszentrum Karlsruhe GmbH, Fed. Rep. of Germany

[21] Appl. No.: 179,780

[22] Filed: Apr. 11, 1988

[30] Foreign Application Priority Data

Apr. 11, 1987 [DE] Fed. Rep. of Germany ..... 87105409

[51] Int. Cl.$^4$ ............................ B01J 49/00; C02F 1/42
[52] U.S. Cl. ...................................... 210/673; 210/687; 521/26
[58] Field of Search ................ 210/670, 673, 685–687; 521/26

[56] References Cited

U.S. PATENT DOCUMENTS

| | | | |
|---|---|---|---|
| 2,227,520 | 1/1941 | Tiger | 210/24 |
| 3,589,999 | 6/1971 | McRae et al. | 210/686 |
| 4,299,922 | 11/1981 | Holl et al. | 210/673 |
| 4,448,693 | 5/1984 | Kiehling et al. | 210/685 |

FOREIGN PATENT DOCUMENTS 2714297  5/1978  Fed. Rep. of Germany .
2413325  7/1979  France .

*Primary Examiner*—Ivars Cintins
*Attorney, Agent, or Firm*—Sughrue, Mion, Zinn, Macpeak & Seas

[57] ABSTRACT

A process for removing cations of a first alkaline earth metal species from an aqueous solution with an ion exchanger material that is a cation exchanger or contains one and subsequently regenerating the loaded or exhausted ion exchanger material. A cation exchanger that has been loaded in advance with cations of a second alkaline earth metal species is used to remove the cations of the first alkaline earth metal species. The cation exchanger that is loaded or exhausted with the first species to be removed is regenerated by bringing the loaded or exhausted cation exchanger into contact with an aqueous suspension of a slightly soluble carbonate and/or hydroxide of the second alkaline earth metal species, either alone or in a mixture with an anion exchanger, and introducing a $CO_2$-containing gas into the suspension.

2 Claims, 1 Drawing Sheet

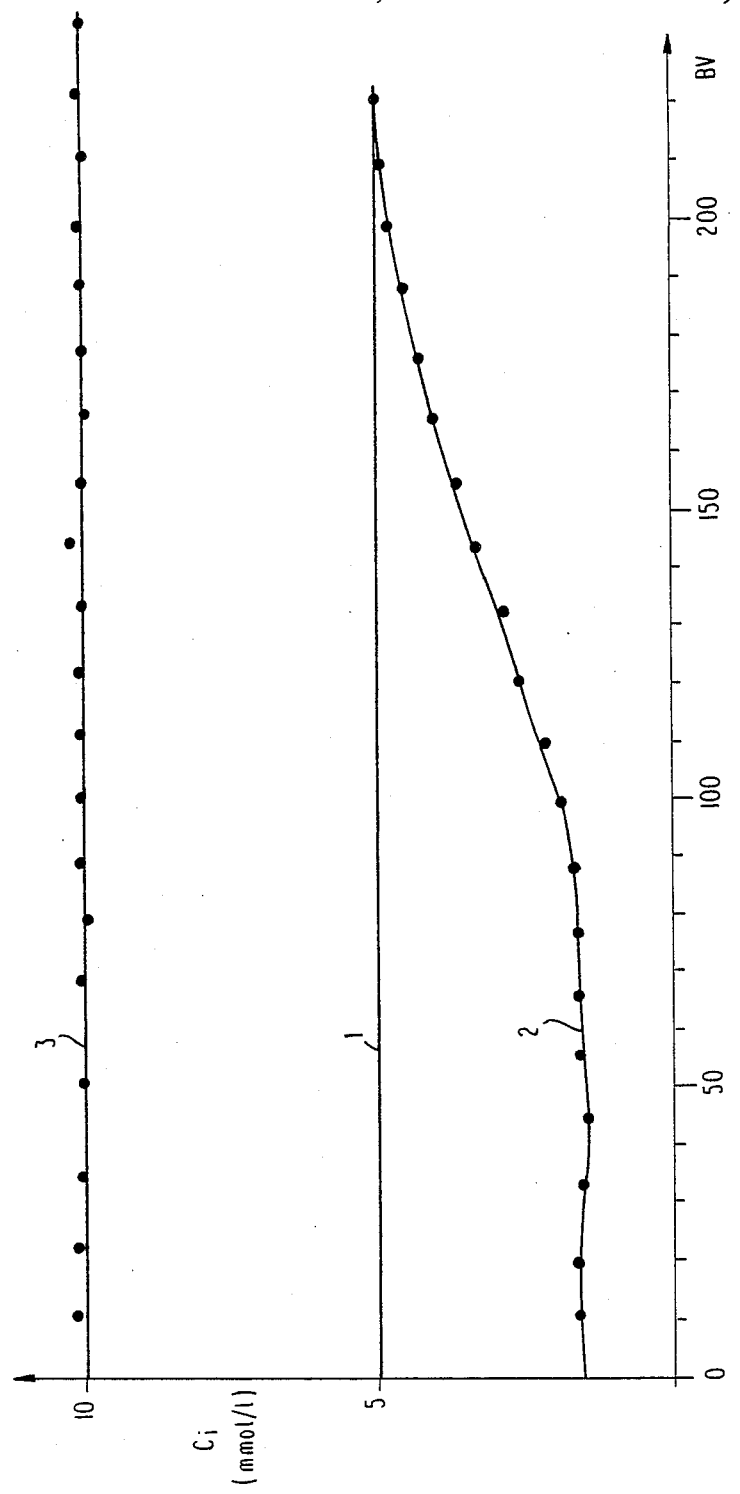

PROCESS FOR THE REMOVAL OF CATIONS OF AN ALKALINE EARTH METAL SPECIES FROM AQUEOUS SOLUTIONS WITH AN ION EXCHANGER MATERIAL

BACKGROUND OF THE INVENTION

The present invention relates to a process for removing cations of an alkaline earth metal species from an aqueous solution with an ion exchanger material that is a cation exchanger or contains one, and for subsequently regenerating the loaded or exhausted ion exchanger material.

For a long time it has been known that alkaline earth ions can be removed from raw water by means of cation exchangers, in particular with sodium-loaded cation exchangers. In this process, sodium ions on the exchanger are exchanged with the alkaline earth ions in the raw water. However, with the currently known processes it is not possible to target and selectively remove an alkaline earth species from raw water which contains several species of alkaline earth ions.

SUMMARY OF THE INVENTION

Therefore, an object of the present invention is to a process for selectively removing alkaline earth metal species from an aqueous solutions containing several alkaline earth species.

Additional objects and advantages of the present invention will be set forth in part in the description which follows and in part will be obvious from the description or can be learned by practice of the invention. The objects and advantages are achieved by means of the processes, instrumentalities and combinations particularly pointed out in the appended claims.

To achieve the foregoing objects and in accordance with its purpose, the present invention provides a process for removing cations of a first alkaline earth metal species from an aqueous solution with an ion exchanger material that is a cation exchanger or contains one, and subsequently regenerating the loaded or exhausted ion exchanger material, comprising: (a) removing the cations of the first alkaline earth metal by a cation exchanger that has been loaded in advance with cations of a second alkaline earth metal species, and (b) regenerating the cation exchanger that is loaded or exhausted with the first species to be removed by bringing the loaded or exhausted cation exchanger into contact with an aqueous suspension of a slightly soluble carbonate and/or hydroxide of the second alkaline earth metal species, either alone or in combination with an anion exchanger, and introducing a $CO_2$-containing gas into the suspension.

Dissolved $CO_2$ reacts with alkaline earth carbonates to give easily soluble bicarbonates; thus the amount of alkaline earth ions is increased. At a given amount of ion exchanger the amount of exchangeable ions is defined; thus the aqueous suspension must be provided in an amount and in a concentration which are sufficient to remove the desired quantity of the resin bound second alkaline earth ion species.

Advantageously, the regeneration includes both the elution of the alkaline earth metal species to be removed and also the conditioning of the free exchanger with the other alkaline earth metal species in the reusable form and is performed in a single processing step. This effect results from the practice of the invention. During the introduction of the $CO_2$-containing gas, the partial pressure of the $CO_2$ in the suspension ranges from 0.1 to 10 bar. Suitable anion exchangers are e.g. described in U.S. Pat. No. 4,448,693.

With the process of the present invention, not only the calcium ions with a cation exchanger in magnesium form, but also the magnesium ions with calcium-loaded exchanger are removable from aqueous solutions.

The process of the invention provides a process for the selective removal of an alkaline earth metal species from aqueous solutions containing several alkaline earth species.

It is to be understood that both the foregoing general description and the following detailed description are exemplary and explanatory, but are not restrictive of the invention. Compounds producing hydroxides of the second alkaline earth metal species in contact with water, e.g. alkaline earth oxide, are likewise useful in the invention.

In the following, the process is explained in detail by means of a description of an example of the process and a graph of the process of the invention.

BRIEF DESCRIPTION OF THE DRAWINGS

The sole FIGURE of the drawing represent a graph of results obtained in accordance with one embodiment of the process of the invention.

DESCRIPTION OF A PREFERRED EMBODIMENT

Calcium was selectively removed from a model solution, serving as raw water, which contained 5 mmol/l calcium ions and magnesium ions, by bringing the solution into contact with a commercially available, strong-acid cation exchanger (with the trade name Amberlite IR-120) in the magnesium form. The quantity of the cation exchanger which was brought into contact with the solution was 900 ml. Prior to the addition of the ion exchanger to the solution, the exchanger had been regenerated with 5 bed volumes of a 1% $Mg(OH)_2$ suspension, whereby the suspension had been saturated with $CO_2$ at a partial pressure of 6 bar. The graph clearly shows the calcium removal action. The first curve (Curve 1) shows the concentration of calcium ions or magnesium ions in the raw water. The second curve (Curve 2) is the so-called break-through curve for the calcium ions, which shows that the break-through of calcium ions into the product water begins at approximately 90 bed volumes (BV) of through-put. At approximately, 220 bed volumes of through-put no exchange occurs. The product water always contains the same sum of calcium+magnesium ions (Curve 3). Up to approximate;ly 90 bed volumes, only approximately 1.5 mmol/l $Ca^{2+}$ remain in the product water. The magnesium concentration is approximately 8.5 mmol/l. The example was carried out at a through-put rate of 10 liters per hour (=approximately 11 bed volumes per hour) of raw water. The result shows that with the process of the invention, calcium ions can be largely removed from raw water.

It will be understood that the above description of the present invention is susceptible to various modifications, changes and adaptations, and the same are intended to be comprehended within the meaning and range of equivalents of the appended claims.

What is claimed is:

1. Process for selectively removing cations of a first alkaline earth metal species from an aqueous solution containing several alkaline earth metal species with an ion exchanger material that is a cation exchanger or contains one, and subsequently regenerating the loaded or exhausted ion exchanger material, comprising:

(a) contacting the aqueous solution containing several alkaline earth metal species with a cation exchanger that has been loaded in advance with cations of a second alkaline earth metal species, to remove the cations of the first alkaline earth metal, and (b) regenerating the cation exchanger that is loaded or exhausted with the first species to be removed by bringing the loaded or exhausted cation exchanger into contact with an aqueous suspension of a slightly soluble carbonate and/or hydroxide of the second alkaline earth metal species, either alone or in combination with an anion exchanger, and introducing a $CO_2$-containing gas into the suspension, to elute the first alkaline earth metal species from the cation exchanger and to condition the cation exchanger with the second alkaline earth metal species in a single processing step.

2. Process as claimed in claim 1, wherein during the introduction of the $CO_2$-containing gas, the partial pressure of the $CO_2$ in the suspension ranges from 0.1 to 10 bar.

* * * * *